United States Patent Office 3,437,772
Patented Apr. 8, 1969

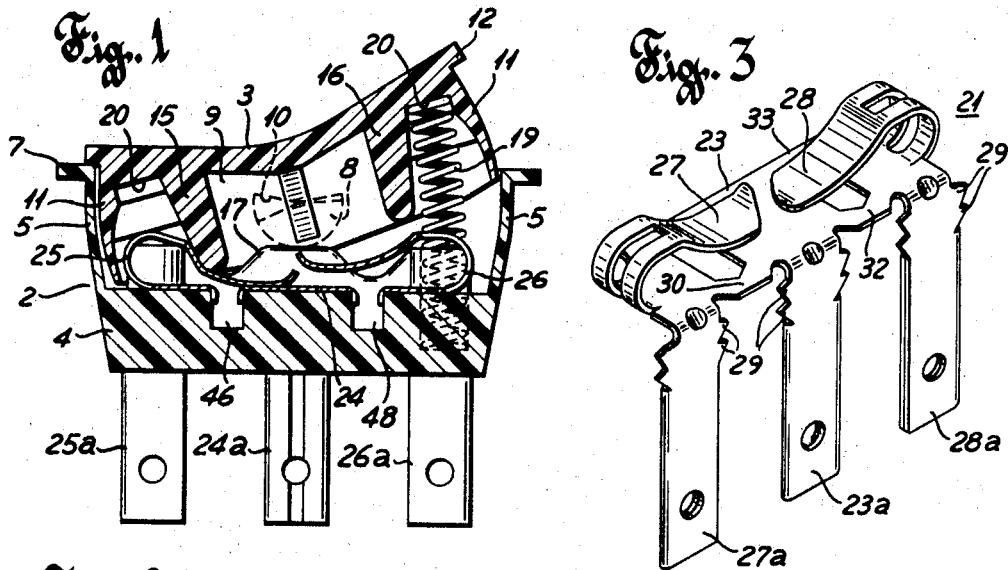
Fig. 1
Fig. 3
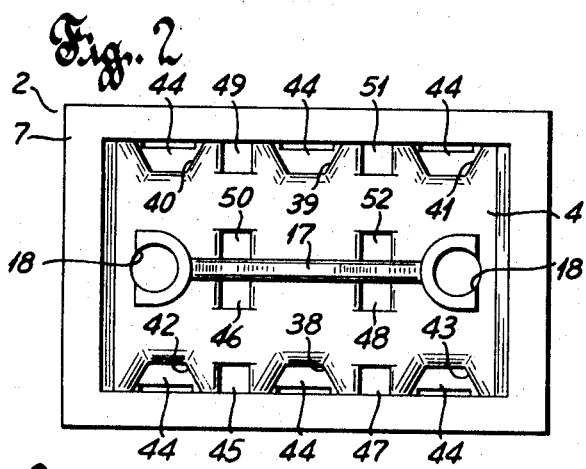
Fig. 2
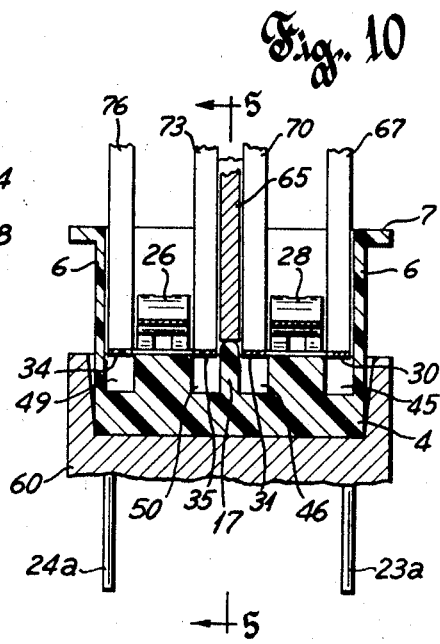
Fig. 10
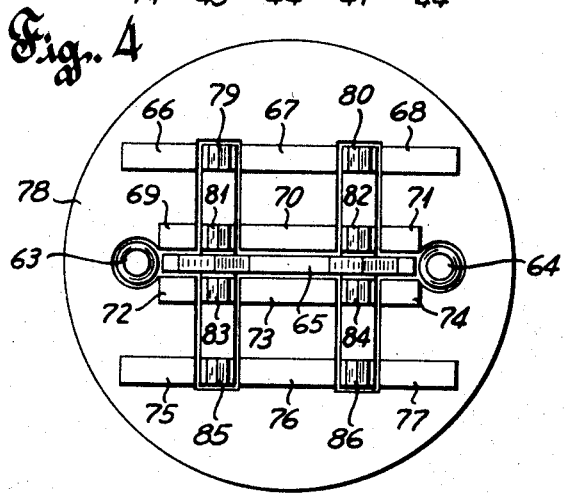
Fig. 4
Inventor
Carl T. Piber
By Thomas E Torphy
Attorney

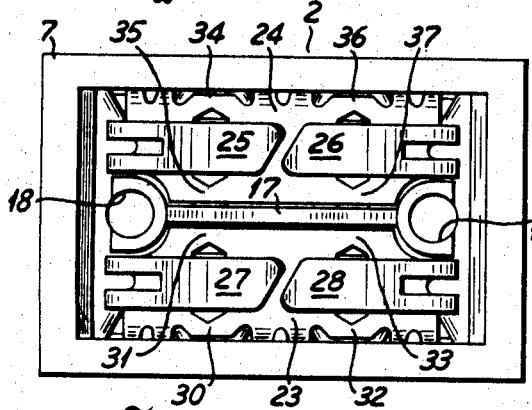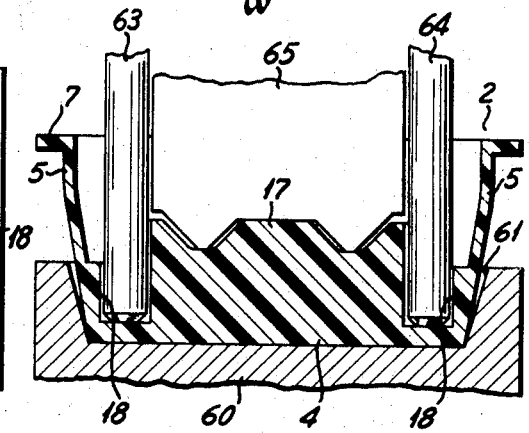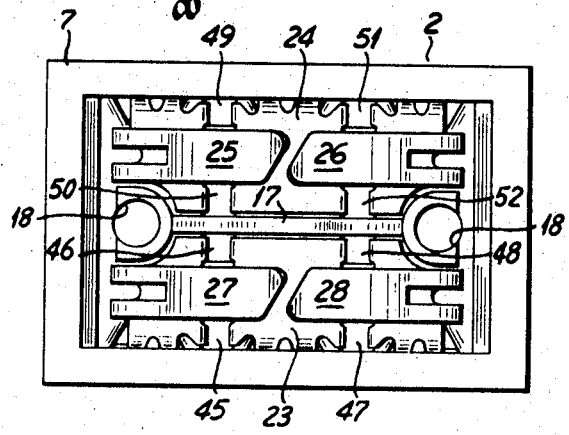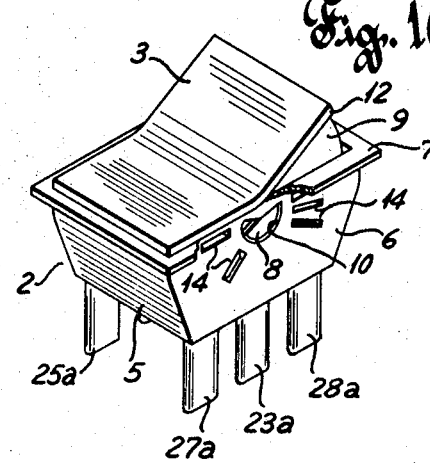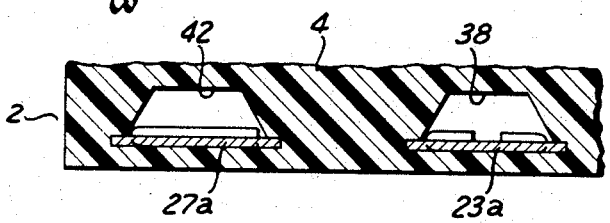

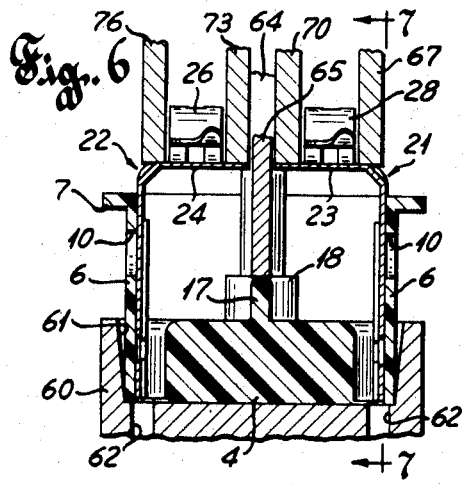
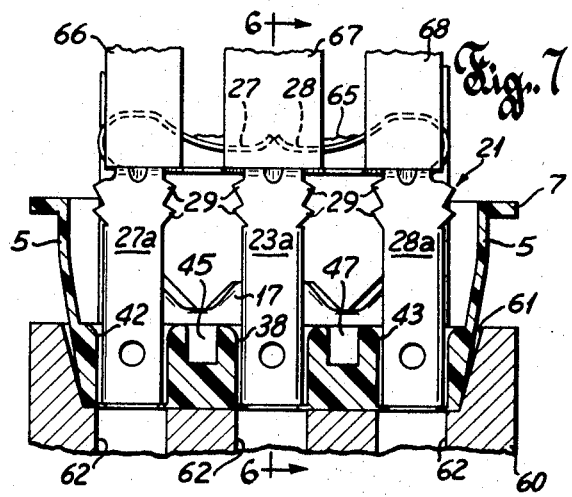
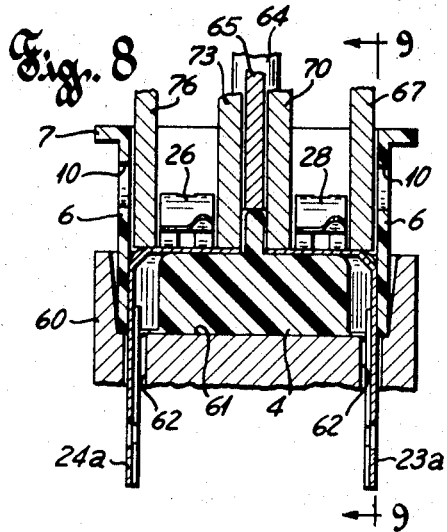
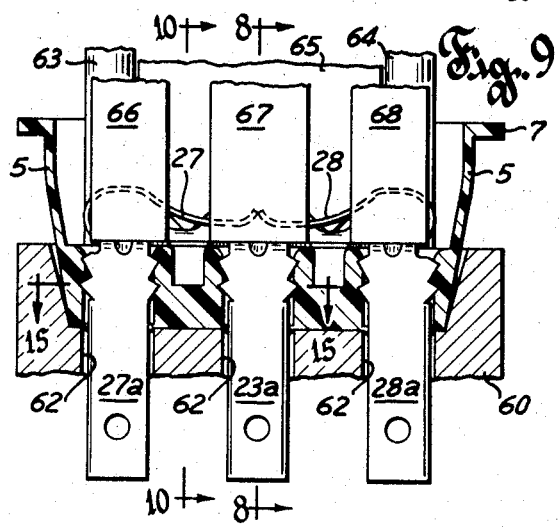
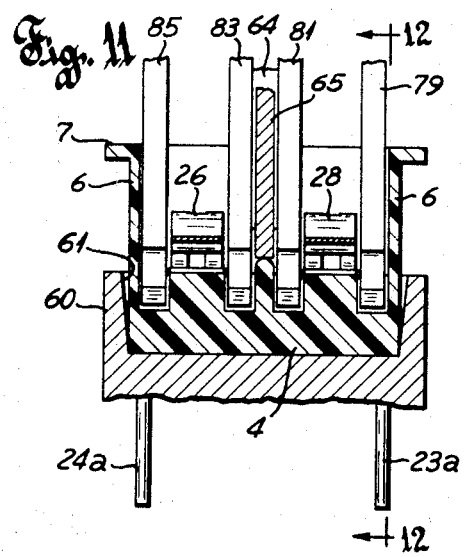
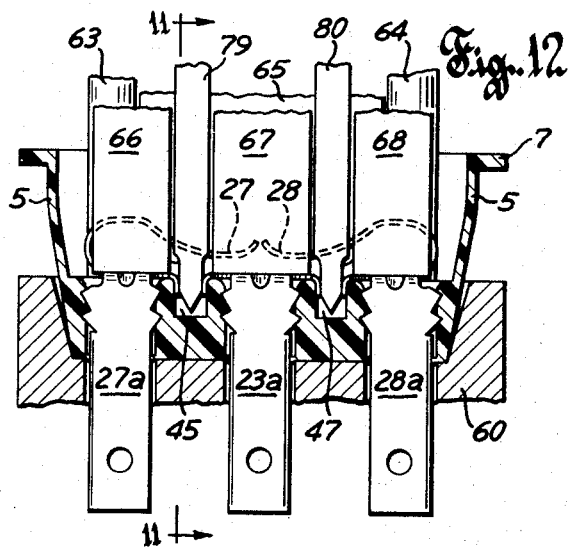

3,437,772
CONTACT STRUCTURE FOR ELECTRICAL
SWITCHING DEVICE AND METHOD OF
ASSEMBLY
Earl T. Piber, Milwaukee, Wis., assignor to Cutler-
Hammer, Inc., Milwaukee, Wis., a corporation of
Delaware
Filed June 6, 1966, Ser. No. 555,389
Int. Cl. H01h 9/00
U.S. Cl. 200—166                    2 Claims

ABSTRACT OF THE DISCLOSURE

An electrical switch device wherein stationary and movable contacts and associated terminals of each pole are formed as a single piece preformed and then emplaced by a straight line tool motion in seated relation in the cavity of an insulating housing. Portions of each terminal extend exteriorly of the housing through individual apertures within which each terminal has an interference fit with the housing. By a subsequent straight line cutting tool motion portions between each contact are severed to isolate the same and their respective terminals from each other. An insulated rocker button having a snap-in mounting in the housing is pivotable to press portions of a movable contact into engagement with stationary contacts.

---

This invention relates to electrical contact structures and the method of assembling the same in electrical switching devices.

In the high quantity manufacture of electrical switches, particularly small switches, it is increasingly important to minimize the number of parts, the number of assembly operations and the amount of manual labor involved in the assembly in order to reduce the cost of manufacturing. At the same time the increased complexity of electrical apparatus demands that the space requirements of switching devices be minimized.

It is therefore a principal object of this invention to provide an economical electrical contact structure which may be assembled in an electrical device quickly and easily.

It is another object of the invention to provide an improved method for assembling contacts in an electrical apparatus.

It is still another object of the invention to provide an electrical switch structure of minimum size and having a relatively small number of parts for ease of assembly.

The objects are accomplished by providing an electrical device having an insulating base member and a contact member or set comprising a plurality of contacts integrally formed. The plurality of contacts may include both stationary and movable contacts. The movable contacts may be formed and positioned with respect to the stationary contacts as to be resiliently deformable or movable to make contact with the stationary contacts. The integral contact set is then fastened to the base member with fastening means individual to each of the contacts. After the contacts are fastened to the base member, the plural contacts are mechanically severed and separated to form electrically isolated contacts. Additionally, means are provided for operating the movable contacts between open and closed positions. Electrical terminals may be formed integrally with each of the contacts.

A more complete understanding of the invention will be had and other objects and advantages will be apparent upon referring to the following description and claims.

While the device hereinafter described is adapted to fulfill the objects stated, it is to be understood that it is not intended that the invention be confined to the particular embodiment disclosed, since it is susceptible of various modifications.

In the accompanying drawings:

FIGURE 1 is a sectional view of a switch embodying the invention;

FIG. 2 is a top view of the base member shown in FIG. 1;

FIG. 3 is an isometric view of a contact member before assembly in the switch shown in FIG. 1;

FIG. 4 is a view showing the arrangement of tooling used in assembling the switch shown in FIG. 1;

FIG. 5 is a sectional view taken on line 5—5 of FIG. 10 and is the first of the series of FIGS. 5 through 12 which illustrate switch elements and assembly tooling during the process of assembly;

FIG. 6 is a sectional view taken on line 6—6 of FIG. 7;

FIG. 7 is a sectional view taken on line 7—7 of FIG. 6;

FIG. 8 is a sectional view taken on line 8—8 of FIG. 9;

FIG. 9 is a sectional view taken on line 9—9 of FIG. 8;

FIG. 10 is a sectional view taken on line 10—10 of FIG. 9;

FIG. 11 is a sectional view taken on line 11—11 of FIG. 12;

FIG. 12 is a sectional view taken on line 12—12 of FIG. 11;

FIG. 13 is a top view of the base and contact assembly before separation of the individual contact elements;

FIG. 14 is a view similar to FIG. 13 but showing the assembly after separation of the individual contact elements;

FIG. 15 is a fragmentary sectional view taken on line 15—15 of FIG. 9; and

FIG. 16 is an isometric view of the assembled switch.

Referring to the drawings, there is shown in FIGS. 1 and 16 a switch assembly including a housing member 2 and a rocker button operator 3, both molded of resilient insulating plastic material such as nylon. The housing member 2 has a relatively thick base 4 and upward extending end walls 5 and side walls 6 defining a rectangular open-topped cavity. A peripheral lip 7 surrounds the upper edge of base 2.

The rocker button operator 3 is pivotally mounted within the open top of the cavity of housing 2 on an opposed pair of lugs 8 which extend from the side walls 9 of operator 3 to pivotally engage a corresponding pair of apertures 10 in the side walls 6 of housing 2. The lower edges of lugs 8 are arcuate in shape to conform with the arcuate lower edges of apertures 10. The upper edges of lugs 8 are shaped so that the cross sections of lugs 8 are something less than semi-circles to permit pivotal movement of lugs 8 within the apertures 10 which are somewhat greater in area than semi-circles. The rocker operator 3 is mounted within housing 2 by spreading the resilient side walls 6 of housing 2 outwardly and inserting operator 3 into housing 2 to allow lugs 8 to snap into apertures 10. The end walls 11 of operator 3 extend between side walls 9 to close the contact chamber and are curved to conform closely to the upper edges of the end walls 5 of housing 2 during the rocking movement of operator 3. A lip 12 extends from the periphery of operator 3 to engage the upper surface of housing 2 and thereby limit the pivotal movement of operator 3. Detent means are provided by a pair of projections (not shown) extending outwardly from the side walls 9 to engage a plurality of spaced slots 14 arranged radially about the pivot apertures 10. One projection is provided on each side of operator and two sets of slots 14 are toward opposite ends of housing 2. A choice of detent actions can, therefore, be had depending on which way the operator 3 is inserted into housing 2.

A pair of wall-like projections 15 and 16 depend from inner upper surface of operator 3 to engage the contacts of the switch in a manner hereinafter explained. A somewhat irregular wall 17 projects upwardly from the base portion 4 of housing 2 to form an insulating wall between two contact areas on the base 4. The wall 17 extends between two generally cylindrical spring holders 18 formed on base 4 for the purpose of holding the lower end of one or two compression springs such as return spring 19 if such springs are required for the desired switch action. The upper end of such springs are retained in recesses 20 in the lower surface of operator 3.

Two contact sets 21 and 22 made of conductive metal sheet are arranged in housing 2 and mounted in base 4. Each set consists of one stationary contact and two movable contacts. The stationary contacts 23 and 24 are placed on opposite sides of wall 17 on the upper surface of base 4. The cantilever spring movable contacts 25, 26, 27 and 28 are arranged in pairs on either side of the associated stationary contacts with their movable ends spaced from and overlying the stationary contact surfaces. As operator 3 is pivoted from one extreme position to the other, the projections 15 and 16 serve to close alternately movable contacts 25 and 27 or 26 and 28.

Each contact is formed integrally with a mounting and terminal member, each given the suffix a. Each of the terminals 23a through 28a has a plurality of barbs 29 at their upper end to firmly secure the terminals in the base 4. Each of the terminals 23a through 28a is double in thickness in that portion below barbs 29. Each of the end terminals such as terminals 27a as shown in FIG. 5 is formed by folding at one edge the metal sheet from which the contacts are formed. The center terminals 23a and 24a are formed by folding the sheet at both edges toward the middle as shown in FIG. 15.

The three contacts and three terminals of each set are integrally formed before assembly from a sheet of spring-like conductive metal as best shown in FIG. 3. Stationary contact 23 is joined to the associated movable contact members 27 and 28 by integral severable strips 30, 31, 32 and 33. Similarly, stationary contact 24 is joined to movable contacts 25 and 26 by integral severable strips 34, 35, 36 and 37. Each of movable contact members 25, 26, 27 and 28 has a cantilever portion formed at its outer end with a return bend formed therein so that the extreme end of the cantilever portion overlies the associated stationary contact and is spaced therefrom. Each of the spring-like cantilever portions of contacts 25, 26, 27 and 28 is deflectable by operator 3 to make contact with the associated stationary contact 23 or 24.

Terminals 23a through 28a are securely mounted in apertures 38 through 43. At the bottom of each of apertures 38 through 43 there is a thin flexible web 44 extending from base 4 to close most of the openings around each terminal and provide a reasonably tight dust seal. When terminals 23a through 28a are inserted in base 4, the barbs 29 engage the resilient material of base 4 to firmly hold the terminals in their respective apertures.

Depressions 45 through 52 are formed in the upper surface of base 4 to underlie the associated severable strips 30 through 37 and receive the severed ends thereof as hereinafter explained.

The tooling used in assembling the aforedescribed switch is preferably adapted to be mounted on and operated by a conventional double acting press (not shown) having a press stroke followed by an impact stroke. A nest 60 adapted to receive and hold the housing 2 is mounted on the lower rim of the press (not shown) and is movable vertically. Nest 60 has a generally rectangular recess 61 in the upper face thereof which has outwardly sloping walls and conforms closely to the bottom of housing 2. Six apertures 62 in the lower surface of recess 61 provide clearance for the terminals 23a through 28a as they emerge from the bottom of housing 2.

FIGURE 4 is a view of the underside of the tooling elements mounted above the housing 2 during assembly.

Two pins 63 and 64 and a guide plate 65 are yieldingly mounted to be vertically movable and biased downwardly. Guide plate 65 extends between pins 63 and 64 but is separately mounted. Pressure pads 66 through 77 are all rectangular in shape and extend downwardly from a pad holder 78. Holder 78 is rigidly mounted to hold pads 66 through 77 firmly and unyieldingly in place. Splitting punches 79 through 86 have sharp chisel-like lower cutting ends and are vertically movable. These punches 79 through 86 are moved downwardly rapidly and preferable with an impact type movement.

The method of assembling the switch now be explined.

Two contact members such as shown in FIG. 3 are placed loosely in the housing on opposite sides of wall 17 in the positions shown in FIG. 6 and 7. At this stage, contacts 25, 24 and 26 are integrally connected and terminals 25a, 24a and 26a loosely rest in apertures 40, 39, and 41, respectively, and in contact with webs 44. Similarly, contacts 27, 23 and 28 are integrally connected and terminals 27a, 23a and 28a loosely rest in apertures 42, 38 and 43, respectively, and in contact with webs 44. The housing 2 together with the contact members, is placed within the nest in the position shown in FIG. 6 and 7.

At this point the upper tooling including guide wall 65, positioning pins 64, pads 66 through 77, and lances 79 through 86, are well above housing 2. The operation of the assembly press is then begun. The nest 60 is pressed upwardly toward the upper tooling. The guide plate 65 and positioning pins 63 and 64 are positioned a considerable distance below the pads 66 through 77. As nest 60 is raised, positioning pins 63 and 64 enter spring holders 18 to properly aline the housing 2 within nest 60 prior to the pressing home of the contact sets 21 and 22. Also, as nest 60 is raised, guide plate 65 slips between the contact set 21 and the contact set 22 to keep these contact sets separated and properly alined during the assembly process. As nest 60 continues to rise, pins 63 and 64 encounter the bottoms of spring holders 18 and plate 65 bottoms on insulating wall 17. Guide plate 65 and pin 63 and 64 are yieldingly mounted so that, through the continued upward movement of nest 60, plate 65 and pins 63 and 64 also move upwardly while remaining firmly biased into engagement with housing 2.

The contacts 23 through 28 begin to be pressed into position at the point at which these contacts engage the pads 66 through 77 as shown in FIGS. 6 and 7. Pads 66 through 77 are rigidly secured to the top of the press (not shown) and remain stationary to thereby press the contacts into base 4. Each contact is engaged by a pair of pads which straddle the movable cantilever portions of the contacts. For instance, as shown in FIG. 6, contact 24 is engaged and pushed into the base 4 by pads 76 and 73.

As the nest 60 continues to rise, the lower ends of terminals 23a through 28a are pushed past the resilient webs 44 in base 4. The upward motion of nest 60 continues until contacts 23 through 28 are pushed to the bottom of housing 2 against the upper surface of base 4, as shown in FIGS. 8 and 9. At this point the barbs 29 of each of terminals 23a through 28a have engaged the walls of their respective apertures 38 through 43, and the terminals and contacts are thereby firmly fastened in place. The upward motion of nest 60 thereupon ceases.

While the housing is held firmly in this position, the contacts 23 through 28 are separated by a rapid impact type blow of the lances 97 through 86. The severable connecting strips 30 through 37 which overlie respectively the depressions 45 through 52 are severed by lances 79, 81, 80, 82, 85, 83, 86 and 84, respectively. The lances travel into the depressions 45 through 52 to separate the severed ends of strips 30 through 37 and bend them over into the depressions 45 through 52, as shown in FIGS. 11 and 12. The movable contacts 25, 26, 27 and 28 are thereby electrically isolated from the stationary contacts 23 and 24.

The assembly of contacts 23 through 28 to housing 2 is then complete. The lances 79 through 86 are then retracted and the nest 60 is lowered. The housing 2 can then be removed from nest 60 manually or preferably by appropriate conventional mechanical means (not shown).

The assembly of the switch is completed by insertion of one or two springs 19 if desired and by snapping the rocker operator 3 into housing 2.

By use of the described switch structure and method of assembly, it can be seen that a two pole, double throw switch without return springs 19 may be manufactured from just four parts, a housing 2, an operator 3 and two contact sets 21 and 22 such as that shown in FIG. 3. The addition of one spring 19 provides a momentary position in one direction of operation. Two springs 19 provide two momentary extreme positions and a center maintained position.

If a single pole switch is desired, one of the contact sets may be eliminated.

I claim:
1. In an electrical switch device comprising:
an insulating base with a cavity therein;
combination contact and terminal means formed integrally and emplaced as a unit within said base cavity and comprising:
  stationary contact means;
  movable contact means having a resilient arm overlying said stationary contact means, and terminal means individual to and integral with each of said contact means and each having a portion extending through a wall of said base with which they have an interference fit for securing their respective contact means in place in said base when the contacts are severed from each other for electrical isolation thereof and their respective terminal means;
and an actuator formed of insulating material supported in said base in overlying relation to said resilient arm of said movable contact means and movable to press the latter into engagement with said stationary contact means.

2. The method of assembling an electrical switch device which comprises the steps of:
(a) providing an insulating base;
(b) providing contact means comprising stationary contact means and movable contact means integrally formed and connected together, said movable contact means being positioned so that a portion thereof is movable into contact with said stationary contact means;
(c) fastening said contact means to said base whereby each of said stationary and movable contact means is individually fastened to said base; and
(d) separating said movable contact means from said stationary contact means after each is fastened to said base whereby said movable contact means is electrically isolated from said stationary contact means but remains movable into contact therewith.

References Cited
UNITED STATES PATENTS
3,140,364  7/1964  Swanke et al.

ROBERT S. MACON, *Primary Examiner.*
H. O. JONES, *Assistant Examiner.*

U.S. Cl. X.R.
29—630